United States Patent [19]

Meadows et al.

[11] 4,143,559
[45] Mar. 13, 1979

[54] TEXTILE APRON AND METHOD OF MAKING SAME

[75] Inventors: Roger D. Meadows, Waynesville; John C. Duckett, Clyde, both of N.C.

[73] Assignee: Dayco Corporation, Dayton, Ohio

[21] Appl. No.: 846,879

[22] Filed: Oct. 31, 1977

[51] Int. Cl.² .................... F16G 1/00; B29D 17/00; B29H 7/22
[52] U.S. Cl. .................................. 74/231 R; 156/137
[58] Field of Search ................... 156/137; 74/231 R

[56] References Cited
U.S. PATENT DOCUMENTS

| | | | |
|---|---|---|---|
| 3,011,221 | 12/1961 | Howell | 19/131 |
| 3,246,372 | 4/1966 | Morell | 19/258 |
| 3,262,826 | 7/1966 | Balkin et al. | 156/171 |
| 3,836,412 | 9/1974 | Boustany et al. | 156/62.2 |
| 3,992,956 | 11/1976 | Bonnefon | 74/231 R |

*Primary Examiner*—Leonard H. Gerin
*Attorney, Agent, or Firm*—Reuben Wolk

[57] ABSTRACT

A textile apron and method of making same are provided wherein such apron is adapted to be operated in an endless path and comprises a polymeric matrix material having a plurality of discrete reinforcing fibers randomly disposed substantially uniformly therethrough and defining the sole reinforcing means of said apron.

20 Claims, 9 Drawing Figures

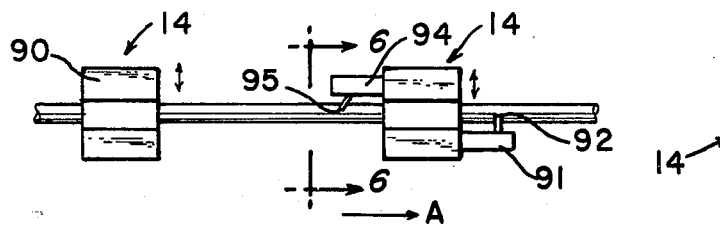
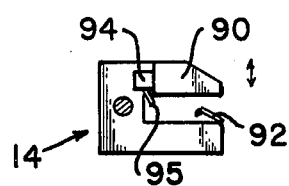
Fig. 5
Fig. 6
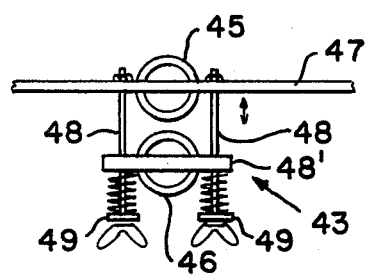
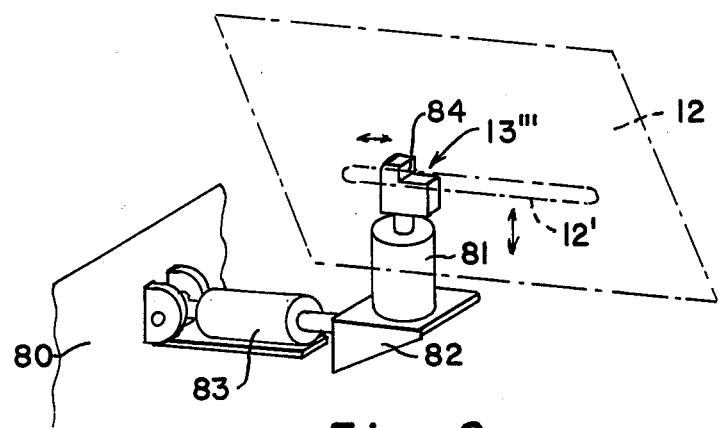
Fig. 7
Fig. 8
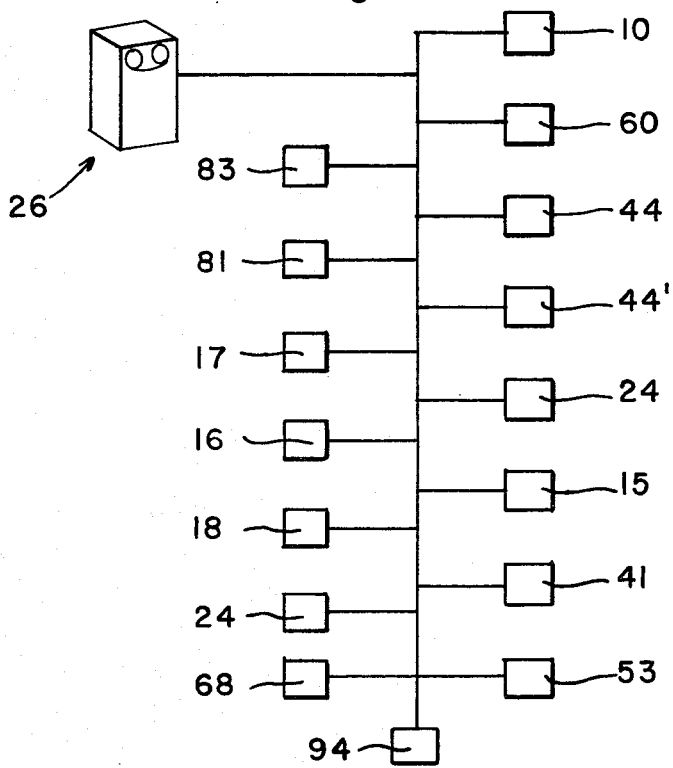
Fig. 9

TEXTILE APRON AND METHOD OF MAKING SAME

BACKGROUND OF THE INVENTION

The processing of textile yarns or fibers usually includes the very important step of drafting or texturing, depending on the type of fibers or yarns being processed. The older and more conventional processing systems utilized discontinuous natural or synthetic fibers which were treated in either single or double long draft apron systems. In this process, drafting aprons were used to draw out the bundle of fibers into greater length and smaller cross-sections, thus creating a strand having uniform properties.

When processing continuous filament synthetic yarns, texturing mechanisms are utilized, and the yarns are passed between texturing aprons which usually impart a twist to the yarns while drawing them out in a manner similar to the drafting system. The yarns are then heat set in a state imparted by the aprons, resulting in increased bulk and improved surface effect that promotes the processing of the yarns into fabrics.

A common problem with existing aprons, whether employed as texturing aprons or drafting aprons used in either the single or double long draft apron system, is the tendency for such aprons to stretch after extended use. Further, conventional aprons, whether new or stretched, have a further problem in tracking precisely during operation thereof in an associated system. In an effort to prevent such undesirable stretching, aprons proposed heretofore have utilized helically wound substantially inextensible cords and/or woven fabric layers embedded in a matrix material. However, such cords and/or fabric layers are expensive and do not provide uniform tensioning of the apron across its width.

SUMMARY

It is a feature of this invention to provide a textile apron which basically overcomes the above-mentioned problems.

Another feature of this invention is to provide a textile apron of the character mentioned which may be operated in an associated drive system at substantially constant tension.

Another feature of this invention is to provide a textile apron of the character mentioned which employs a plurality of discrete reinforcing fibers disposed throughout a polymeric matrix material which enable such apron to provide the desired performance characteristics.

Another feature of this invention is to provide a textile apron of the character mentioned which is adapted to be operated in an endless path wherein the apron comprises a polymeric matrix material having a plurality of discrete reinforcing fibers randomly disposed therethrough in a substantially uniform manner and defining the sole reinforcing means of the apron with the substantially uniform disposal providing uniform reinforcement of the apron at each cross-sectional position thereof across its width which assures precise wobble-free tracking during operation of the apron in an associated drive system.

Another feature of this invention is to provide a method of making an apron of the character mentioned.

Another feature of this invention is to provide a method of making a textile apron of the character mentioned employing a polymeric ribbon having reinforcing fibers embedded therein.

Therefore, it is an object of this invention to provide a textile apron of the character mentioned and method of making same having one or more of the novel features set forth above or hereinafter shown or described.

Other features, objects, details, uses, and advantages of this invention will become apparent from the exemplary embodiments thereof presented in the following specification, claims, and drawing.

BRIEF DESCRIPTION OF THE DRAWING

The accompanying drawing shows present preferred embodiments of this invention, in which

FIG. 5 is a perspective view illustrating the completed apron defined from the construction of FIG. 4 after processing thereon;

FIG. 6 is a fragmentary cross-sectional view taken essentially on the line 6—6 of FIG. 5;

FIG. 7 is a perspective view with a fragmentary portion broken away illustrating another exemplary embodiment of the apron of this invention which may be used interchangeably with the apron illustrated in FIG. 5; and FIG. 8 is a fragmentary cross-sectional view similar to FIG. 6 illustrating that the apron of this invention may be made of a polymeric material in the form of a synthetic plastic.

DESCRIPTION OF ILLUSTRATED EMBODIMENTS

Figure 1:
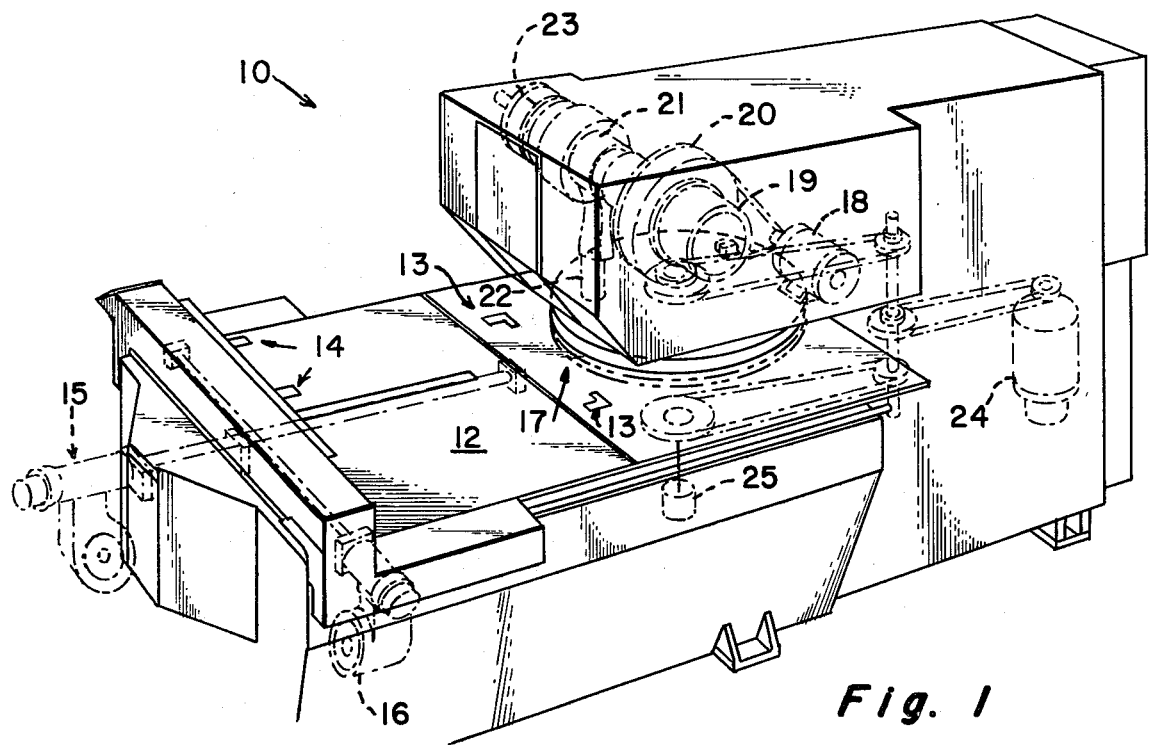
FIG. 1 is a perspective view illustrating a pair of exemplary textile aprons of this invention mounted on associated components comprising a typical double apron system.
Figure 2:
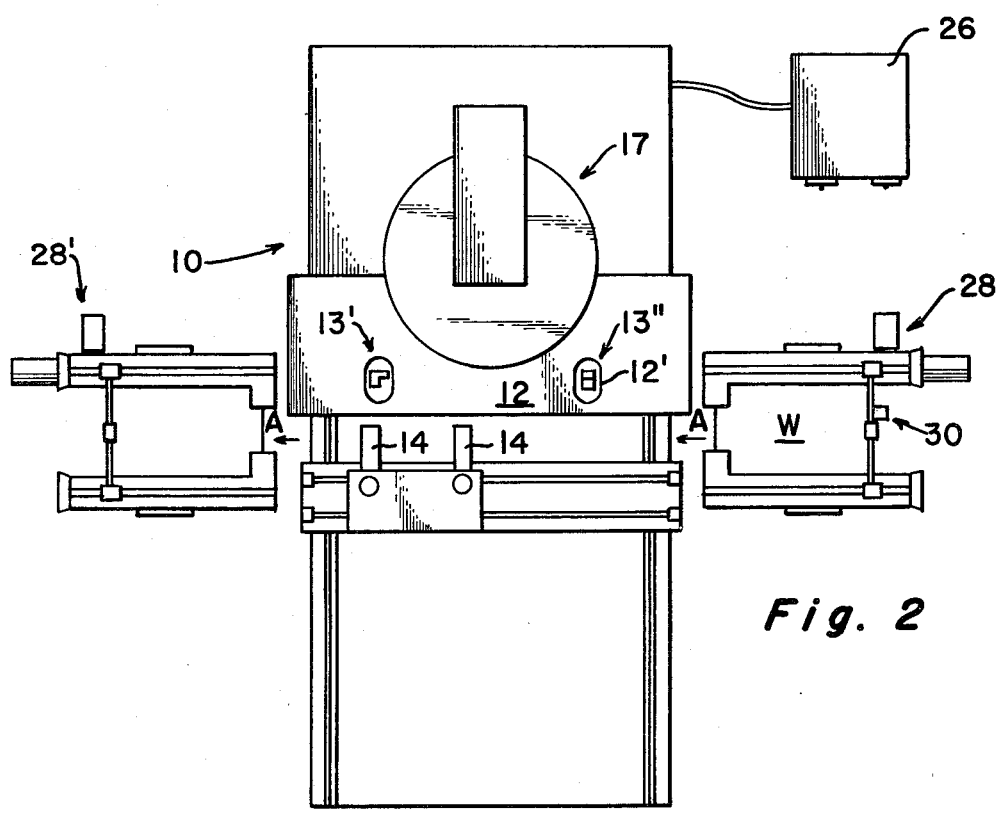
FIG. 2 is a perspective view illustrating a single exemplary textile apron mounted on associated components comprising a single apron system.
Figure 3:
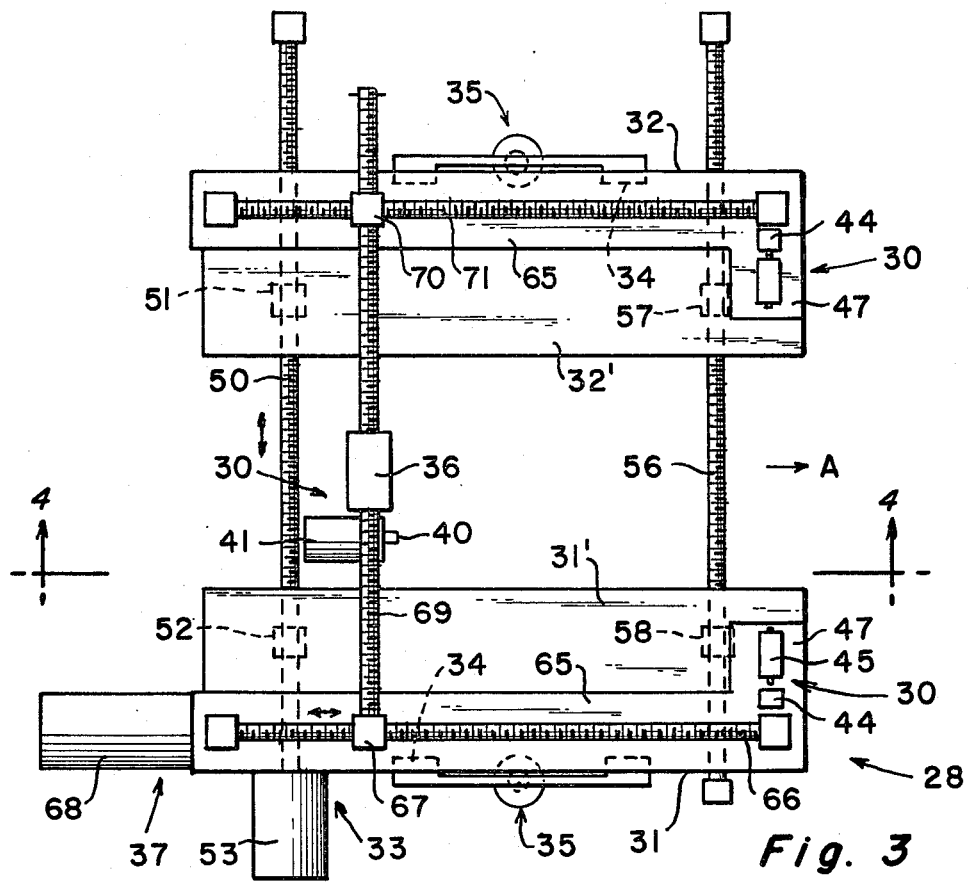
FIG. 3 is an end view illustrating another embodiment of a single textile apron and associated components comprising another exemplary single apron system.

Reference is now made to FIGS. 1, 2, and 3 of the drawing for presentations of typical texturing or drafting aprons as used in a double apron system (FIG. 1) and as used in single apron systems (FIGS. 2 and 3). Each of these aprons though of different physical size is of the same construction and for simplicity and ease of presentation, each of these aprons is designated by the same general reference numeral 10.

The apron 10 is particularly adapted to be operated in an endless path which is parallel to a central longitudinal axis of such apron 10; and, as seen in FIG. 6 the apron 10 comprises a polymeric matrix material 12 which is shown by cross-hatching as being in the form of a rubber compound which may be either a natural rubber compound or a synthetic rubber compound.

The matrix material 12 has a plurality of discrete elongate reinforcing fibers 13 randomly disposed therethrough and such fibers define the only or sole reinforcing means of the apron 10. The fibers 13 are disposed through the matrix material 12 in a substantially uniform manner with such fibers being in substantially parallel relation; and, the substantially uniform dispersal of the fibers is indicated at 14 in FIG. 6 by the uniform placement of dots representing the fibers 13. The uniform fiber disposal provides uniform reinforcement of the apron 10 at each cross-sectional position thereof across its width which assures precise wobble-free tracking during operation of the apron in an associated drive system.

The apron 10 may be made utilizing one example of the method of this invention which will now be described with reference to FIGS. 4 and 5. Accordingly, the apron 10 may be defined by providing an elongate sheet or ribbon 15 of polymeric matrix material 12 having reinforcing fibers 13 suitably dispersed therethrough in parallel relation and parallel to the elongate dimension or longitudinal axis of the ribbon. The fibers 13 may be suitably embedded in the ribbon 15 using any suitable technique such as calendering, or the like.

Figure 4:
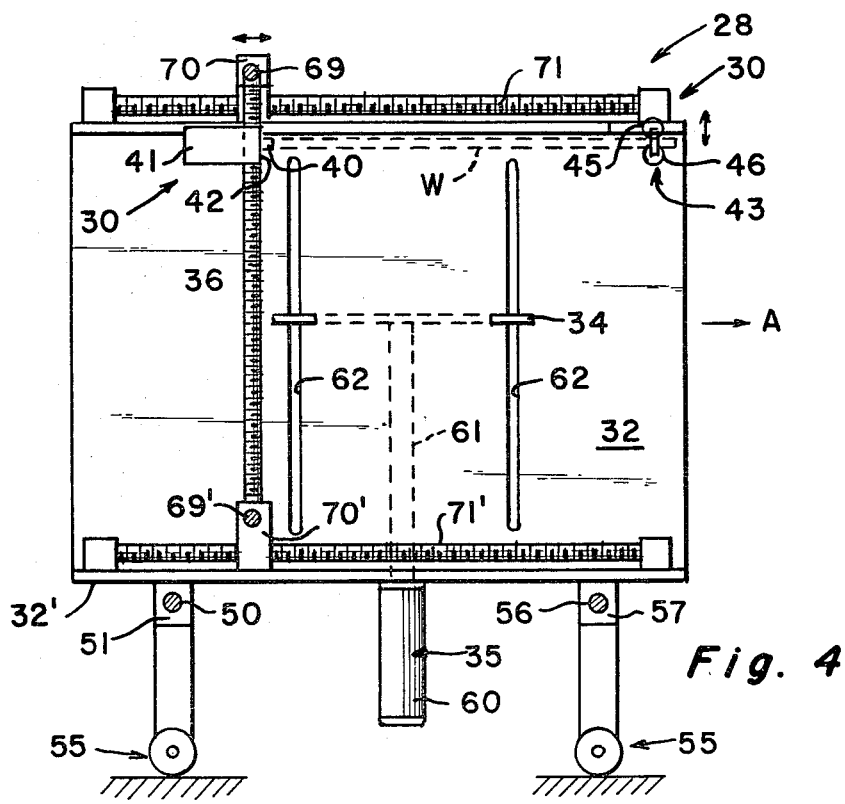
FIG. 4 is a perspective view illustrating one method which may be employed in forming the exemplary aprons of FIGS. 1–3 wherein an elongated ribbon having reinforcing fibers dispersed therethrough is initially wound in at least one turn and then subsequently suitably processed to define an apron.

The ribbon 15 is suitably wrapped around a suitable building mandrel to define an apron construction of either a single ply or a plurality of plies such as two plies or layers as illustrated at 16 in FIG. 4; and, the opposite ends of the ribbon 15 are radially aligned as shown at 17 so that once cured the apron has a substantially uniform thickness throughout. With this arrangement it will be seen that the fibers 13 are disposed in parallel relation and parallel to the endless path of the apron 10 defined from such construction. The apron construction thus defined is then cured in a suitable curing apparatus whereupon the individual layers or plies are fused together as a single-piece mass free of fusion lines and such mass has a homogeneous character throughout, i.e., the properties of the polymeric matrix with its embedded fibers are substantially uniform throughout. The cured construction at this point is in the form of a tubular sleeve of substantial height parallel to its central longitudinal axis and such sleeve is suitably cooled, ground, and cut to desired width to define a plurality of aprons 10. The curing, cooling, grinding, and cutting is achieved utilizing any suitable method and apparatus known in the art.

Another exemplary embodiment of the textile apron of this invention is illustrated in FIG. 7 of the drawing. The apron of FIG. 7 is very similar to the apron 10; therefore, such apron will be designated by the reference numeral 10A and representative parts of such apron which are similar to corresponding parts of the apron 10 will be designated in the drawing by the same reference numeral as in the apron 10 followed by the letter designation A and not described again in detail.

The apron 10A is comprised of a polymeric matrix material also in the form of a rubber matrix 12A and is provided with reinforcing fibers 13A. The main difference between the apron 10A and the apron 10 is that in the apron 10A the reinforcing fibers are disposed as will now be described.

In particular, the fibers 10A are disposed in a plurality of sets with the fibers in each set being in substantially parallel relation. Further, for each set of fibers disposed in parallel relation at a particular angle to the endless path of the belt there is basically another set of such fibers disposed in parallel relation at an angle to the endless path opposite the particular angle.

In the forming of a tubular sleeve from which aprons 10A are cut the disposal of fibers in a plurality of sets may be achieved by employing a plurality of ribbons, two for example, each having fibers parallel to its longitudinal axis and wherein one ribbon and its fibers is helically wound in tubular form and disposed at the previously mentioned particular angle to the endless path of the sleeve construction and the other ribbon and its fibers is helically wound at an angle opposite the particular angle. A similar result could be obtained with two sheets which are bias cut relative to their parallel fibers with one sheet being wrapped to define a sleeve construction as previously mentioned and having its fibers at the particular angle as described earlier and the other sheet being similarly wrapped and having its fibers at an angle opposite the one angle.

The above-described two techniques provide control of the orientation of parallel fibers by control of associated ribbons or sheets having such fibers embedded therein; however, it has been found that the disposal of parallel fibers in numerous sets with each set having its fibers at a particular angle to the endless path of its sleeve construction and a corresponding set with its fibers at an angle opposite thereto relative to the endless path of such sleeve construction (and hence each final apron) may be achieved by employing an extrusion die apparatus. In such extrusion apparatus a polymeric mass containing fibers 13A is provided from an extruder and initially formed as a small diameter molten tube structure having fibers arranged parallel to its longitudinal axis whereupon the small diameter tube structure is flared rapidly perpendicular to the tube structure axis by a bullet-nosed die mechanism causing the formation of a final larger diameter sleeve construction. During the flaring action the fibers are disposed as explained in this paragraph. The final sleeve construction is then cured, cooled, ground, and cut as described earlier to define a plurality of aprons 10A.

It has been found that an I-shaped test section cut with the vertical arm of such I parallel to the endless path of its associated apron 10A has substantial strength. Consistently such strength is generally of the order of 65 percent the strength of a similar I-shaped test section taken from an apron 10.

The apron 10A made by extrusion of an associated sleeve and employing the above-described extrusion apparatus has fibers disposed in a plurality of directions which might appear to be uncontrolled yet it has been found that the number of fibers disposed with their elongated dimension in one direction relating to the endless path of the apron is compensated for roughly by a corresponding number of fibers having their elongated dimension in a direction relatively to such endless path which is opposite the one direction thereby providing an offsetting action which results in the apron 10A not only having substantial strength but also having the precision tracking capability previously described.

The aprons 10 and 10A have been illustrated and described as comprised of matrix material which has been described in the specification and cross-hatched in the drawing as being a rubber compound and preferably a nitrile rubber is employed. However, it will be appreciated that each apron 10 and 10A may be made as described above of a polymeric material in the form of a synthetic plastic material as shown in FIG. 8 wherein such a synthetic plastic matrix material is designated 12M and has fibers 13M disposed therethrough essentially as shown and described in connection with FIG. 6.

The fibers 13, 13A, and 13M which are utilized in the various exemplary aprons disclosed herein may be made of any suitable material. Satisfactory results have been obtained using wood cellulose fibers manufactured by the Monsanto Company of St. Louis, Mo., and such fibers are sold under the registered tradmark of SAN-TOWEB. In one embodiment these fibers had an elastic modulus of 2 to 5 × 10$^6$ psi and a tensile strength of 6 to 9 × 10$^4$ psi with an average diameter of 8 to 16 microns and a length of 1 to 9 millimeters. These fibers are further described in U.S. Pat. Nos. 3,836,412 and 3,709,845, and as disclosed therein are suitably treated to promote bonding thereof in the elastomeric matrix.

The aprons 10 illustrated in FIG. 1 may have a nominal circular diameter of 1 9/32 inches, a width of 1½ inches, and a thickness of 0.060 inch. The apron 10 of FIG. 2 may have a circular diameter of 3⅛ inches, a width of 1 15/32 inches, and a thickness of 0.035 inch. Similarly, the apron 10 of FIG. 3 may have a circular diameter of 3⅛ inches, a width of 1⅛ inches, and a thickness of 0.060 inch. These sizes have been presented merely as examples of sizes which may be used; however, it is to be understood that the apron of this invention may be of any suitable size employed in the art.

While present exemplary embodiments of this invention, and methods of practicing the same, have been illustrated and described, it will be recognized that this invention may be otherwise variously embodied and practiced within the scope of the following claims.

What is claimed is:

1. A textile apron adapted to be operated in an endless path, said apron comprising polymeric matrix material having a plurality of discrete reinforcing fibers randomly disposed therethrough in a substantially uniform manner and defining the sole reinforcing means of said apron, said substantially uniform disposal providing uniform reinforcement of said apron at each cross-sectional position thereof across its width which assures precise wobble-free tracking during operation of said apron in an associated drive system.

2. An apron as set forth in claim 1 in which said fibers are disposed throughout said matrix in substantially parallel relation and parallel to said endless path.

3. An apron as set forth in claim 2 in which said polymeric matrix material is comprised of a plurality of layers each having a plurality of parallel reinforcing fibers dispersed therethrough, said layers being fused together as a single-piece mass free of fusion lines therebetween.

4. An apron as set forth in claim 1 in which said fibers are disposed in said matrix roughly in sets with the fibers of one set being disposed in parallel relation at a particular approximate angle relative to said endless path and with the fibers of another set being disposed in parallel relation and at an approximate angle relative to said endless path which is opposite from said particular angle to provide a complementary disposal of reinforcing fibers which assures said precise tracking.

5. An apron as set forth in claim 1 in which said polymeric matrix material is a rubber compound.

6. An apron as set forth in claim 1 in which said polymeric matrix material is a synthetic plastic material.

7. An apron as set forth in claim 1 in which each of said fibers has a length generally of the order of 2 millimeters.

8. An apron as set forth in claim 1 in which said fibers are wood-cellulose fibers having an elastic modulus of 2 to 5 × 10$^6$ psi and a tensile strength of 6 to 9 × 10$^4$ psi.

9. An apron as set forth in claim 3 in which said plurality of layers are defined by a ribbon having said fibers disposed therein and with said ribbon being wound in a plurality of turns.

10. An apron as set forth in claim 9 in which said polymeric matrix material is a nitrile rubber.

11. A method of making a textile apron adapted to be operated in an endless path comprising the steps of, forming an apron-defining sleeve construction comprised of a polymeric matrix having a plurality of discrete reinforcing fibers randomly disposed therethrough in a substantially uniform manner with said fibers defining the sole reinforcing means of said construction, curing and cooling said construction, and cutting said construction to define said apron whereby said substantially uniform disposal of fibers in said construction provides uniform reinforcement of said apron at each cross-sectional position thereof across its width which assures precise wobble-free tracking during operation of said apron in an associated drive system.

12. A method as set forth in claim 11 in which said forming step comprises forming said sleeve construction in a plurality of layers which during said curing step are fused together as a single-piece mass free of fusion lines therebetween.

13. A method as set forth in claim 12 in which said forming of said sleeve construction in said plurality layers comprises winding a ribbon having said fibers disposed therein in a plurality of turns.

14. A method as set forth in claim 11 in which forming step comprises forming said sleeve construction by extrusion process.

15. A method as set forth in claim 11 in which said forming step comprises providing a rubber compound to define said matrix.

16. A method as set forth in claim 15 in which said forming step comprises providing said rubber compound in the form of a nitrile rubber.

17. A method as set forth in claim 11 in which said forming step comprising providing a synthetic plastic material to define said matrix.

18. A method as set forth in claim 11 and comprising the further step of grinding said construction prior to said cutting step.

19. A method as set forth in claim 11 in which said forming step comprises providing said fibers as wood cellulose fibers.

20. A method as set forth in claim 19 in which said step of providing wood cellulose fibers comprises providing said fibers each having a length generally of the order of 2 millimeters.

* * * * *

UNITED STATES PATENT OFFICE
CERTIFICATE OF CORRECTION

Patent No. 4,143,559                               Dated  March 13, 1979

Inventor(s)  Roger D. Meadows and John C. Duckett

It is certified that error appears in the above-identified patent and that said Letters Patent are hereby corrected as shown below:

Column 5, line 14, "1½" should be --- 1 3/4 ---

*Signed and Sealed this*

*Twenty-fifth* Day of *September 1979*

[SEAL]

Attest:

Attesting Officer

LUTRELLE F. PARKER
*Acting Commissioner of Patents and Trademarks*